United States Patent
John et al.

(10) Patent No.: US 8,381,190 B2
(45) Date of Patent: *Feb. 19, 2013

(54) LEVERAGING THE RELATIONSHIP BETWEEN OBJECT IDS AND FUNCTIONS IN DIAGNOSING SOFTWARE DEFECTS DURING THE POST-DEPLOYMENT PHASE

(75) Inventors: Kurian John, Bangalore (IN); Kamala Parvathanathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,884

(22) Filed: Mar. 6, 2012

(65) Prior Publication Data
US 2012/0166884 A1    Jun. 28, 2012

Related U.S. Application Data

(63) Continuation of application No. 12/631,549, filed on Dec. 4, 2009.

(51) Int. Cl.
*G06F 9/44* (2006.01)
(52) U.S. Cl. ........................................ 717/125
(58) Field of Classification Search ............ 717/125
See application file for complete search history.

(56) References Cited

U.S. PATENT DOCUMENTS

| | | | |
|---|---|---|---|
| 5,537,590 A | 7/1996 | Amado et al. | |
| 5,847,972 A | 12/1998 | Eick et al. | |
| 6,389,483 B1* | 5/2002 | Larsson | 719/313 |
| 7,174,536 B1 | 2/2007 | Kothari et al. | |
| 7,251,584 B1 | 7/2007 | Perazolo et al. | |
| 7,373,554 B2 | 5/2008 | Chandrasekaran | |
| 7,870,396 B2* | 1/2011 | Kamei | 713/190 |
| 2004/0078667 A1 | 4/2004 | Salem | |
| 2005/0091642 A1 | 4/2005 | Miller | |
| 2009/0150420 A1 | 6/2009 | Towner | |

OTHER PUBLICATIONS

Mark Brodie et al., "Quickly Finding Known Software Problems via Automated Symptom Matching", IEEE International Converence on Autonomic Computing (ICAC), 2005.*
Eick, S., et al., "Seesoft—A Tool for Visualizing Line Oriented Software Statistics", IEEE Transactions on Software Engineering, Nov. 1992, Abstract, vol. 18, Issue 11.
Chi, E., "A Framework for Information Visual Spreadsheets", [online] Thesis, Abstract, Mar. 1999, University of Minnesota, [retrieved Dec. 4, 2009] retrieved from the Internet: <http://homepages.mcs.vuw.ac.nz/~elvis/db/references/chi99framework>.

* cited by examiner

*Primary Examiner* — Chun-Kuan Lee
(74) *Attorney, Agent, or Firm* — Patents on Demand P.A.; Brian K. Buchheit; Scott M. Garrett

(57) ABSTRACT

A hashing tool can be used to generate Object UIDs from a software application. The software application can be tested. A change and release management system can receive Object UIDs involved in a defect uncovered during the testing. The change and release management system can receive names of functions involved in the defect uncovered during the testing and defect fixing. A graphical representation of function names versus Object UIDs for which the defect occurred can be created.

14 Claims, 2 Drawing Sheets

US 8,381,190 B2

LEVERAGING THE RELATIONSHIP BETWEEN OBJECT IDS AND FUNCTIONS IN DIAGNOSING SOFTWARE DEFECTS DURING THE POST-DEPLOYMENT PHASE

CROSS-REFERENCE TO RELATED APPLICATIONS

This application is a continuation of U.S. patent application Ser. No. 12/631,549, filed Dec. 4, 2009 (pending), which is incorporated herein in its entirety.

BACKGROUND

The present disclosure relates to the field of software and, more particularly, to leveraging the relationship between object IDs and functions in diagnosing software defects during the post-deployment phase.

After software is bought and used by the end user, there is typically a support process in place to help support the end user. Usually, a support team in the organization accepts the support call and helps the customer depending on the type of support required. There may be different levels of support staff in the support team.

For example, an initial call can be accepted by a support person at the Level 0. This person logs the call and tries to solve the problem at a basic level. If this person cannot help, he or she escalates the issue to the next level, typically to the Level 1 support engineer. The Level 1 support engineer tries to understand the problem, and tries basic configuration help. The problem escalates, for example, to Level 2. At Level 2 the typical problems addressed are related to some advanced configuration or other known issue of the software being unable to co-exist with other software products. The problem escalates to Level 3 if there is a defect or bug, which has to be fixed in the source code of the software application. Different organizations may have different numbers of levels. One of these levels will typically have someone responsible for fixing defects or bugs in software products.

The person at Level 3 who has to fix defects or bugs can have the source code of the software and a change management system to help with addressing the defects. In an organization that uses multiple levels, this top level person leverages all the symptoms articulated by the lower level support people on this case before it gets to him or her. The person who has to fix defects in the source code finds the cause within the source code and fixes the source code to solve the particular problem.

A function verification test (FVT) cycle is a period in time when most of the functionality of a software application is tested during development. This testing is typically done in iterations or cycles so that each FVT cycle catches newer defects. A project plan for software application development may specify that there be one or more function verification testing cycles during the development of the software product. There is an inherent gap in the software development lifecycle and process in that the data collected from the FVT phase is not reused in any other phase, especially in post-sales support.

SUMMARY

There is a lot of information related to every defect which is reported and fixed during the function verification cycle, which can be used by support teams.

Various embodiments provide the usage of tools such as a change and release management tool and a function verification test tool to capture such data and render the data in a format which support teams can more easily interpret to focus in on the causality of issues more quickly. This helps post-sales/post-release support people. This particularly helps support engineers who are new to a particular application.

Some embodiments provide systems and methods to map a symptom of a defect against its cause in a usable format to aid a support team in diagnosing software defects. In some embodiments, an object which has a defect is identified from a functional verification test or tester's report. In some embodiments, a stack trace of a defect is used to determine where the defect emanated in the source code.

Some embodiments provide creating a mapping of an Object UID versus the origin of the defect within the source code. In some embodiments, the mapping is created in a spread sheet, and then a heat map generator is used to scan the spread sheet and generate a heat map to be used by a support team.

DETAILED DESCRIPTION

Figure 1:
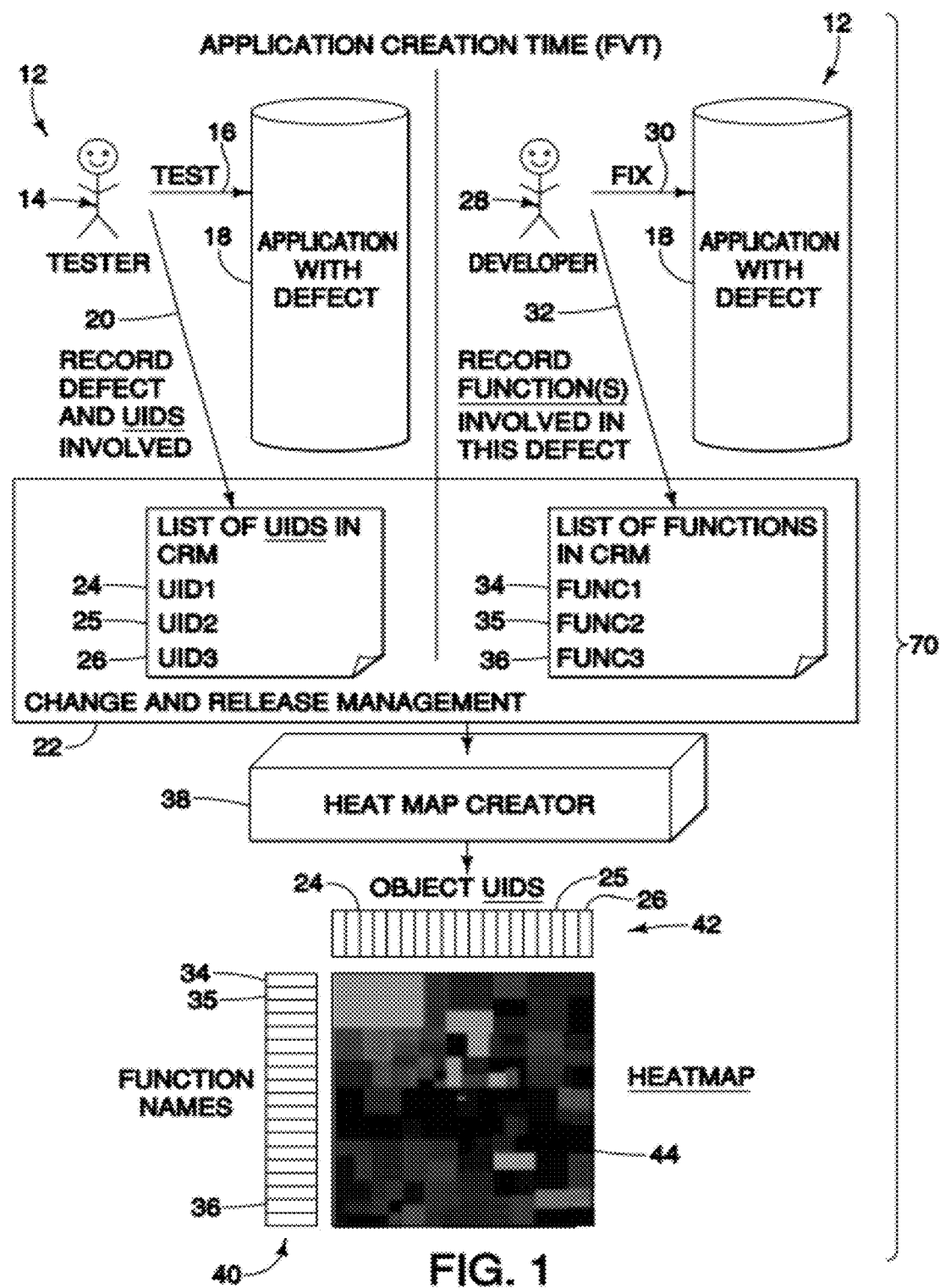
FIG. 1 is a pictorial flow chart of an exemplary embodiment of a method for handling software defects and a data processing network or system for carrying out the method.

FIG. 1 illustrates a method in accordance with various embodiments. During application development, such as in a function verification test cycle 12, a test engineer 14 captures a stack of software objects (object unique identifiers or UIDs) which were involved in the failure of a particular test 16 of a software product (application) 18.

A stack can be a last in, first out (LIFO) data structure. An object can be a component of a software program that knows how to perform certain actions and to interact with other pieces of the program. An object can have a set of data along with methods for manipulating that data. The objects described herein can be, for example, objects for graphical user interfaces.

Object UIDs for various objects in the software 18 can be generated using the method and system described below in connection with FIG. 2.

In the embodiments illustrated in FIG. 1, the Object UIDs (which are generated from the hashing process) along with the defects are entered 20 in a change and release management (or source code management) system 22 (e.g., by the tester). Typically, when a software product is built, source code and defects are tracked in a change and release management (CRM) or source code management (SCM) system 22 such as, for example, Bugzilla (TM), Rational ClearCase (TM) or Rational ClearQuest (TM). The change management system 22 is used so that stakeholders can communicate with each other about defects that are found and the changes to the source code which will result. Change management systems are typically used during the period when a software product is being developed.

More particularly, in the illustrated embodiment, the Object UIDs 24, 25, 26 etc. of objects involved in a defect are received and recorded (stored in a database) by the change and release management system 22. In some embodiments, the change and release management system 22 has a list of all Object UIDs, from the system and method of FIG. 2, and a tester 14 indicates which UIDs were involved with a defect.

A developer 28 who fixes 30 a defect can capture a stack trace and can use the stack trace to determine where the defect potentially emanates in the source code. A stack trace or stack traceback is a report of the functions instantiated by the execution of a program. It keeps track of how local variables change on each invocation of a routine as well as the values that they return. The developer 28 enters 32 the functions involved in a defect in the change and release management system 22. More particularly, the change and release management system 22 receives and records (stores in memory) a list of functions 34, 35, 36 etc. involved in the defect.

In the illustrated embodiments, a heat map creator tool 38 walks all the defects and maps an exhaustive list 40 of functions in this application 18 to an exhaustive list 42 of object unique identifiers to produce a heat map 44 with function names on one axis and Object UIDs on another axis. The heat map creator 38 walks the defect record and creates a pheromone map from Object UID versus function. In time, more of the occurrences of links between Object UIDs and functions will result in "hotter" areas on the heat map.

In some embodiments, different colors are used to indicate different heat levels. For example, a bright red color may indicate a high occurrence linkage between a particular object and a particular function, a dark green color may indicate a low defect rate, and orange, yellow, and light green colors may indicate intermediate defect rates. Other colors or other graphical or tabular indications of potential problem areas can be used in other embodiments.

The heat map 44 is then stored as an artifact along with code frozen bits (final source code) of this particular software product for later use by support people. In some embodiments, the heat map 44 is a spreadsheet. In some embodiments, the heat map creator 38 and the change and release management system 22 are defined by separate computer devices that are in communication with one another over a network. In other embodiments, the heat map creator 38 and the change and release management system 22 are defined by a single computer device.

Figure 2:
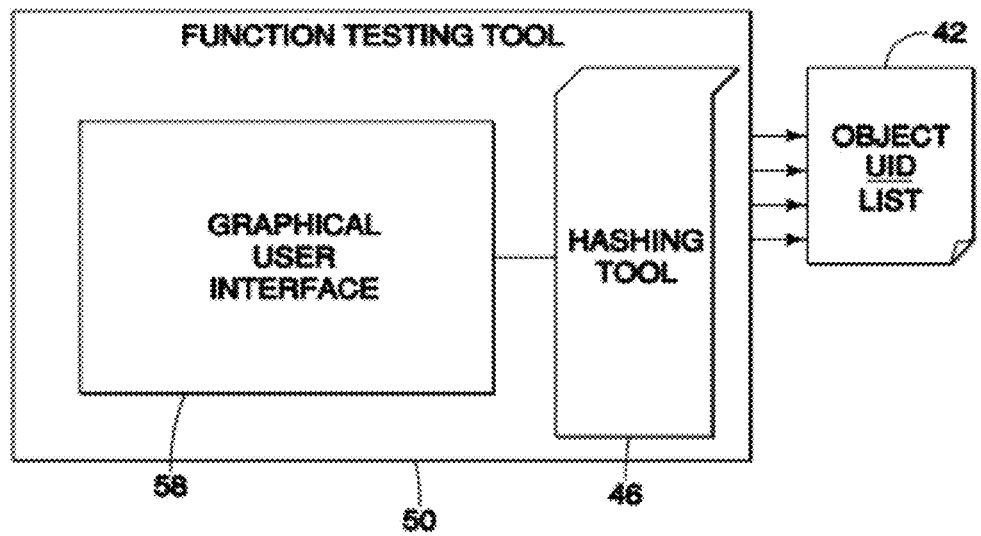
FIG. 2 is a pictorial flowchart showing details of a step of the method of FIG. 1.

FIG. 2 illustrates a system and method for generating the list 42 of all Object UIDs 24, 25, 26, etc. of FIG. 1, in some embodiments. As illustrated in FIG. 2, a hashing tool 46 is used to create the list 42 of object unique identifiers (UIDs) from the unique characteristics of respective objects (such as elements or objects of a graphical user interface 48). Any one of a variety of functional testing tools 50 can be employed to create these Object UIDs. The lists 42 and 40 (see FIG. 1) of object unique identifiers and functions are captured in the change and release management system 22.

When a defect is reported from the production environment, the support engineer can simulate the defect in his or her own environment. During the process of simulation, the engineer will use the Object UID creation tool which is the hashing tool to generate the Object UID of the Graphical User object which is showing the symptom of the particular defect.

Figure 3:
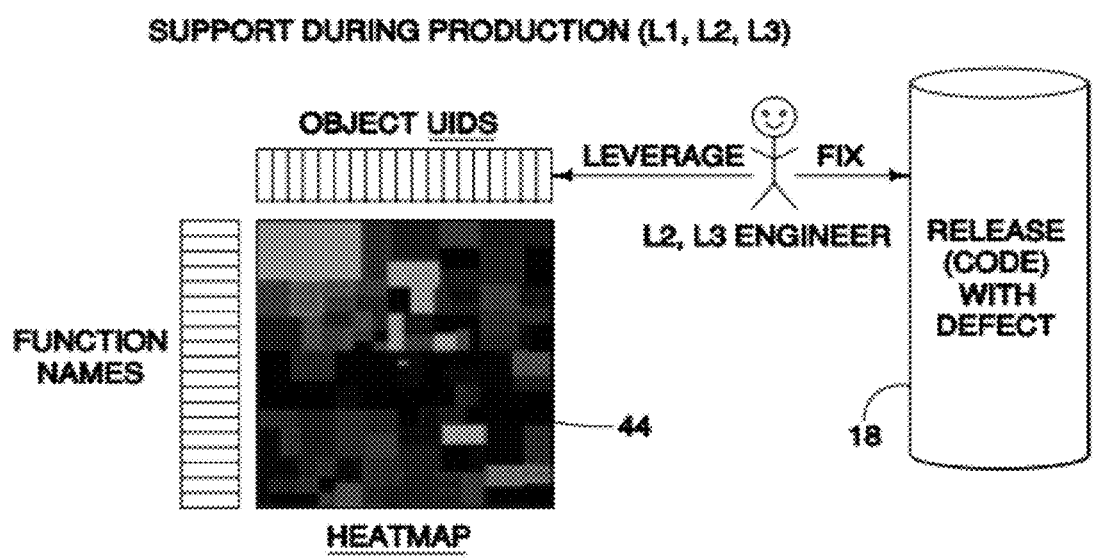
FIG. 3 is a pictorial flowchart illustrating use of a product produced by the method of FIG. 1.

As illustrated in FIG. 3, after the software 18 has been released, higher level support people (e.g., Level 2 and Level 3 support people) are provided access to the heat map 44. These support people, when given a support problem, can look up the heat maps and find out which are the functions that are likely candidates to have created a defect, involving the particular Object UIDS, and solve the problem faster. In some embodiments, the change and release management system 22 and/or the heat map creator 38 and/or a network containing the change and release management system 22 and the heat map creator 38 has an access control, and access is given to a (post-release) customer support person. For example, it may be necessary to use a password to gain access to a network and only certain persons on the network are given permission to access the change and release management system 22 and/or the heat map creator 38, and a customer support person is given such access.

Embodiments of the invention can take the form of entirely hardware elements, entirely software elements or a combination containing both hardware and software elements. In a preferred embodiment, embodiments of the invention are implemented as software elements, which include but are not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description set out above describes particular embodiments only and is not intended to limit the invention, whose scope is determined solely by the claims set out below. As used here, singular forms "a", "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In compliance with the patent statutes, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments.

What is claimed is:

1. A method comprising:
   executing instructions by hardware in a data processing system to perform steps including:
   using a hashing tool to generate Object unique identifiers (UIDs) from a software application;
   testing the software application for defects;
   receiving, at a change and release management system, Object UIDs involved in the defects uncovered during the testing;
   receiving, at the change and release management system, function names involved in the defects uncovered during the testing;
   creating a heat map of the function names versus the Object UIDs for which the defects occurred; and
   using the heat map to fix the defects of the software application.

2. The method in accordance with claim 1 and further comprising using the heat map in post-release customer support of the software application.

3. The method in accordance with claim 2 and further comprising attempting to fix the defects during the testing phase and before the customer support.

4. The method in accordance with claim 1, wherein creating the heat map using a heat map creator that is in communication with the change and release management system.

5. The method in accordance with claim 4 wherein the heat map creator and the change and release management system are defined by separate computer devices that are in communication with one another over a network.

6. The method in accordance with claim 1 wherein the change and release management system has an access control and wherein the method further comprises providing access, using the access control, to a customer support person.

7. The method in accordance with claim 1, wherein a non-transitory computer readable medium bears instructions for causing a computer to execute the steps of claim 1.

8. A method comprising:
   executing instructions by hardware in a data processing system to perform steps including:
   generating Object unique identifiers (UIDs for objects of a software application;
   testing the software application using a function verification testing tool for defects;
   storing Object UIDs involved in the defects uncovered during the function verification test;
   using a stack trace to determine function names involved in the defects;
   attempting to repair the defects;
   storing the function names involved in the defects that were determined using the stack trace;
   creating a heat map of the function names versus the Object UIDs for which the defects occurred; and
   using the heat map in providing customer support, wherein information about the defects learned during software development is made available to customer support.

9. The method of claim 8 wherein the Object UIDs are obtained using a hashing tool.

10. The method of claim 8 wherein the storing of the Object UIDs comprises storing the Object UIDs in a change and release management system.

11. The method of claim 10 wherein the storing of the function names comprises storing the function names in the change and release management system.

12. The method of claim 10 wherein the change and release management system is defined by a computer device.

13. The method of claim 12 and further comprising storing the heat map along with code frozen bits.

14. The method of claim 8 wherein creating the heat map comprises creating the heat map with different colors used to indicate different levels of occurrence linkage between the Object UIDs and the function names.

* * * * *